Sept. 8, 1936. J. B. WHITTED 2,053,861
WINDSHIELD WIPER
Filed March 26, 1934 2 Sheets-Sheet 1
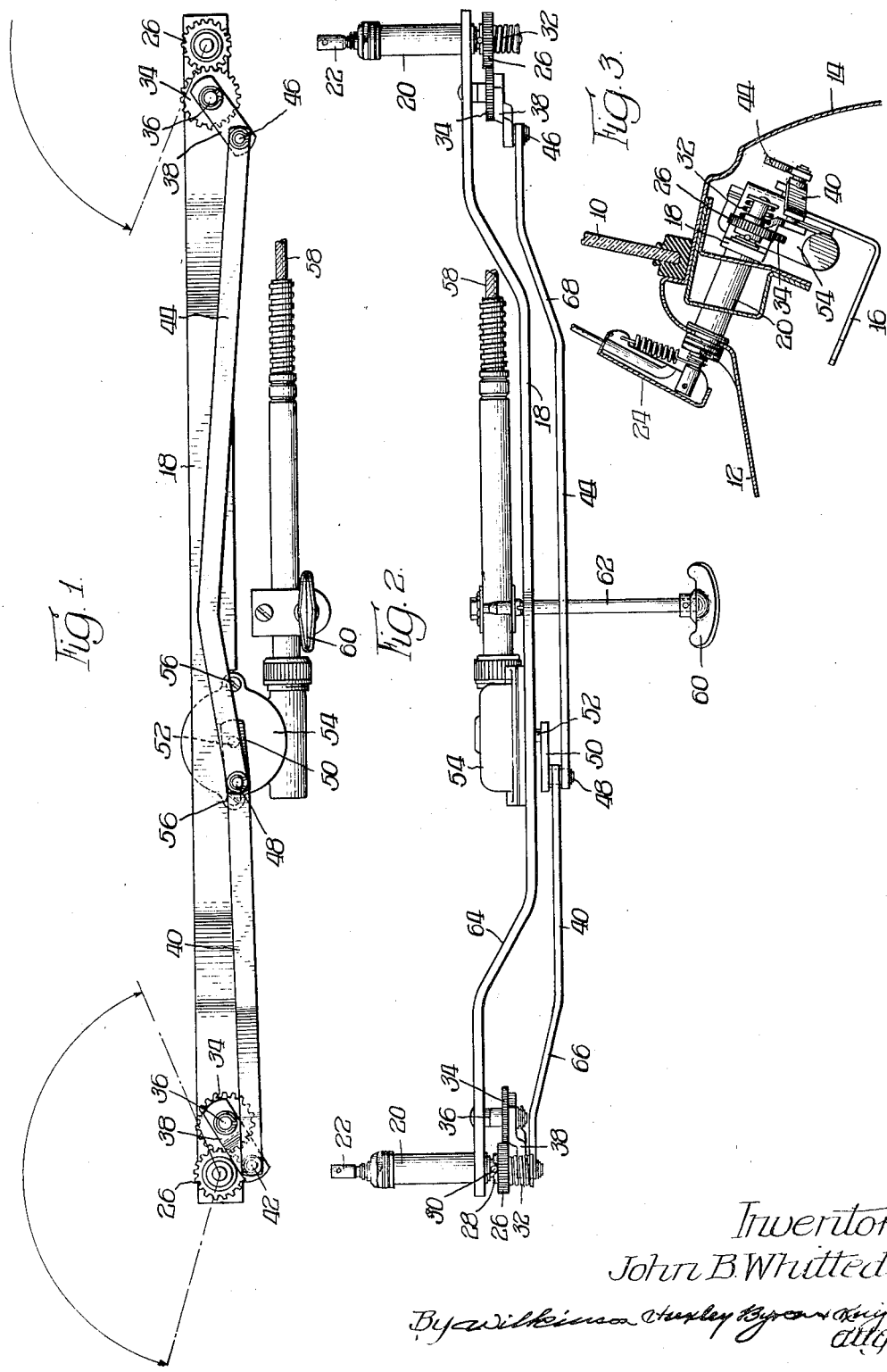
Inventor:
John B. Whitted, Sept. 8, 1936. J. B. WHITTED 2,053,861
WINDSHIELD WIPER
Filed March 26, 1934 2 Sheets-Sheet 2
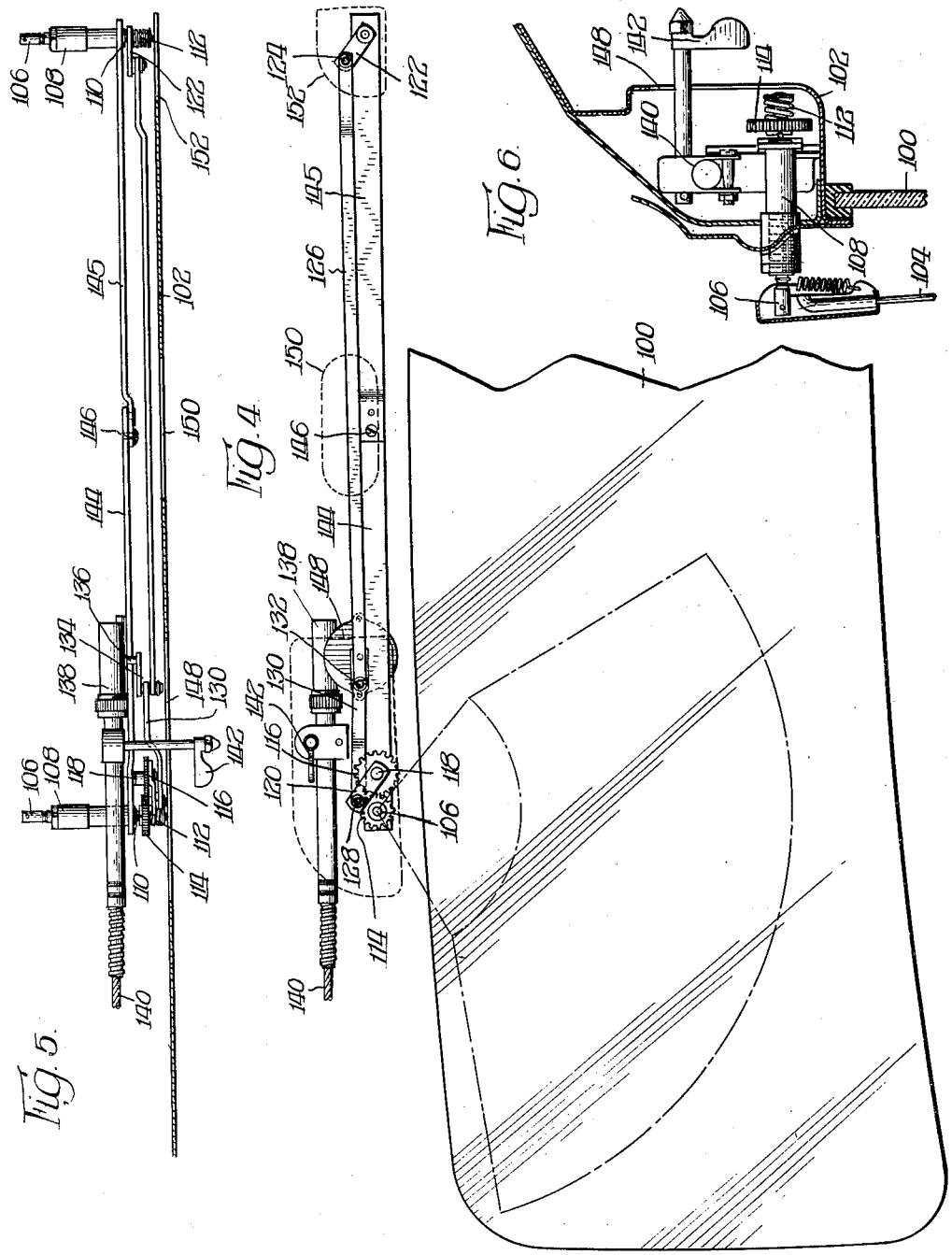
Inventor:
John B. Whitted,
By Wilkinson Huxley Byron & Knight
Attys.

Patented Sept. 8, 1936

2,053,861

UNITED STATES PATENT OFFICE 2,053,861

WINDSHIELD WIPER

John B. Whitted, Evanston, Ill., assignor to Stewart-Warner Corporation, Chicago, Ill., a corporation of Virginia Application March 26, 1934, Serial No. 717,341

4 Claims. (Cl. 74—81)

This invention relates to improvements in windshield wipers and more particularly to the driving means for operating a pair of windshield wipers.

The present application is in the nature of an improvement over the disclosures in my prior applications, identified as Serial No. 692,911, filed October 9, 1933, and Serial No. 692,588, filed October 7, 1933. In my prior disclosures, I have shown a windshield wiper which is mechanically driven instead of being vacuum operated, as has been the customary practice.

It is an object of the present invention to provide mechanical driving means for a pair of windshield wipers which may be conveniently mounted either beneath or above the windshield.

It is further an object of my invention to provide a mechanical windshield driving means including a rotatable element which operates through lateral linkage to drive a pair of windshield wipers and in which means is provided for obtaining a wide angle of movement for each wiper without approaching a dead center position of the linkage.

Further objects and advantages of my improvements will be more readily apparent from the following detail description taken in connection with the attached drawings, in which Figure 1 is an elevation of the driving means for a pair of windshield wipers adapted to be mounted beneath the windshield.

Figure 2 is a plan view of the mechanism shown in Figure 1;

Figure 3 is a detail section showing the mounting of the driving means in relation to the windshield;

Figure 4 is an elevational view of a modified design adapted to be mounted above the windshield which is partially shown in the figure;

Figure 5 is a plan view of the construction shown in Figure 4, and

Figure 6 is a detail section similar to Figure 3 but showing the modified construction.

Referring to the construction shown in Figures 1, 2 and 3, the windshield 10 is shown associated with a portion of the cowl 12 and dash 14. The bracket member 16 constitutes a mounting for the longitudinal support 18. A tubular housing 20 is fixed to each end of the support 18 and receives an oscillatable wiper shaft 22, the shaft 22 being connected to the wiper arm 24. A gear 26 is loosely mounted on the shaft 22 on the inner side with respect to the support 18 and is provided with a notched portion 28 pressed into engagement with a drive pin 30 carried by the shaft 22 by a spring 32. This construction is shown more in detail in my application Serial No. 692,588. Each of the gears 26 is in meshing relation with an adjacent gear 34 rotatably carried by a pivot pin 36. Each of the gears 34 is operated by a crank 38. A link 40 is connected to one of the crank arms 38 by a pivotal connection 42 and a link 44 is connected to the other crank arm 38 by a pivotal connection 46. The links 40 and 44 are operated from a pivotal connection 48 at their inner ends carried by a crank arm 50. The crank arm 50 is driven by the shaft 52 which is mounted in the casing 54. The casing 54 is fixed to the support 18 by the connections indicated at 56. The casing 54 contains gearing through which the shaft 52 is rotated from the flexible drive shaft 58. The handle 60 carried by the rod 62 operates clutch means through which the driving of the flexible shaft is controlled. This construction is shown in detail in my application Serial No. 692,911.

It will be noted that the gears 34 are of somewhat larger size than the gears 26 whereby the movement imparted to the crank arms 38 is amplified so as to produce a larger throw of the wiper arm. Thus, in Figure 1, the wiped area is shown to include an arc of approximately 140°. By this arrangement the cranks 38 are never in dead center positions during operation of the windshield wipers. As shown in Figure 2 the support 18 may have bent portions 64 so as to bring the gearing 34—36 substantially in the same plane with the casing 54. The link 40 may correspondingly have a bent portion 66 while the link 44 is bent as at 68. By this arrangement the parts can be installed where there is a minimum of space, as is shown by the end view of Figure 3.

Figures 4, 5 and 6 illustrate a modified arrangement designed for installation above a windshield 100. A portion of the windshield frame is indicated at 102, the wiper arms 104 are oscillatable by the shafts 106 carried by tubular housings 108. Each of the shafts has clutch means 110 controlled by spring means 112. One of the springs 112 engages a gear 114 driven from an adjacent gear 116 carried by pivot 118 and operated by a crank arm 120. The other shaft 106 is operated by the crank arm 122 connected by pivotal connection 124 to a link 126. The crank arm 120 is similarly pivotally connected at 128 to link 130. The links 126 and 130 are pivotally connected at 132 to the crank arm 134 driven by shaft 136 mounted in casing 138 containing gearing operated from a flexible drive shaft 140 and handle 142 controls clutch means in the flexible drive. The support 144 is made in two parts 145 connected at 146 for purpose of convenient assembly. Thus the windshield wiper frame 102 is provided with spaced openings 148, 150 and 152 whereby the casing 138 and associated parts, together with the part 144 of the support may be assembled through the opening shown in broken lines at the left of Figure 4 while the other portion 145 of the support may be assembled through the opening 152 at the other end and access may be had to make the connection 146 through the opening 150.

This arrangement may be employed where it is desired that one wiper, usually the one in front of the driver, has a wider angle of movement than the other wiper.

I claim:

1. In a windshield wiper mechanism, a pair of spaced oscillatable wiper shafts, an intermediate rotatable drive shaft, a single crank arm on said drive shaft, links pivotally connected at their inner ends to said crank arm and outwardly extending therefrom, a pair of cranks pivotally connected to the outer ends of said links for operation thereby and for driving said wiper shafts and gear means interposed between at least one of said cranks and a wiper shaft for amplifying the movement of said wiper shaft derived from said crank.

2. In a windshield wiper mechanism, an elongated supporting member, a pair of oscillatable wiper shafts rotatably mounted in said support member, mechanical driving means therefor carried by an intermediate portion of the support member, said means including means for imparting a larger angle of movement to one of said wiper shafts than the other of said wiper shafts.

3. In a windshield wiper mechanism, an elongated supporting member, a pair of oscillatable wiper shafts mounted at the outer ends of said supporting member, a gear carried by each of said wiper shafts, a pair of gears of larger diameter than said first-mentioned gear, each of said second gears being rotatably mounted on said supporting member in meshing relation with one of said first mentioned gears, a pair of cranks for driving said second gears, a single intermediately located rotatable crank arm carried from the supporting member, and links connecting the rotatable crank arm and each of the pair of cranks to drive the wiper shafts.

4. In a windshield wiper mechanism, an elongated supporting means, a pair of spaced wiper shafts pivoted adjacent the ends of said supporting member, a pair of gears mounted thereon for operating said shafts, a second pair of gears mounted on the elongated supporting member in meshing relation with said first mentioned gears, a pair of cranks for operating said last mentioned gears carried by said gears, driving mechanism and a rotatable drive shaft carried by an intermediate portion of the elongated supporting member, the elongated supporting member being offset an amount substantially the depth of the driving mechanism, the driving mechanism fitting in said offset portion upon the opposite side of the elongated supporting member to the gears on the wiper shafts, and offset crank and link connections from said drive shaft to the cranks for operating said second pair of gears.

JOHN B. WHITTED.